US008428608B2

(12) United States Patent
Liu et al.

(10) Patent No.: US 8,428,608 B2
(45) Date of Patent: Apr. 23, 2013

(54) METHOD AND SYSTEM FOR RESOURCE ALLOCATION IN RELAY ENHANCED CELLULAR SYSTEMS

(75) Inventors: Yong Liu, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1017 days.

(21) Appl. No.: 12/167,990

(22) Filed: Jul. 3, 2008

(65) Prior Publication Data

US 2009/0163220 A1 Jun. 25, 2009

Related U.S. Application Data

(60) Provisional application No. 61/016,385, filed on Dec. 21, 2007.

(51) Int. Cl.
*H04W 72/00* (2009.01)
*H04B 3/36* (2006.01)
*H04B 7/14* (2006.01)

(52) U.S. Cl.
USPC ............. 455/452.2; 455/453; 455/7; 370/315

(58) Field of Classification Search .................. 455/450, 455/451, 452.1, 452.2, 453; 370/315
See application file for complete search history.

(56) References Cited

U.S. PATENT DOCUMENTS

| 5,530,575 | A   | * | 6/1996  | Acampora et al. ............. 398/58 |
|-----------|-----|---|---------|--------------------------------------|
| 6,590,865 | B1  |   | 7/2003  | Ibaraki et al.                       |
| 7,349,665 | B1  | * | 3/2008  | Zhu et al. ..................... 455/11.1 |
| 7,623,863 | B2  |   | 11/2009 | Chen et al.                          |
| 7,630,355 | B2  |   | 12/2009 | Tao et al.                           |
| 7,830,916 | B2  |   | 11/2010 | Qi et al.                            |
| 7,889,699 | B2  |   | 2/2011  | Suh et al.                           |
| 7,916,680 | B2  |   | 3/2011  | Miller et al.                        |
| 7,917,149 | B2  |   | 3/2011  | Chen et al.                          |
| 8,055,189 | B2  |   | 11/2011 | Tsai et al.                          |
| 2004/0136379 | A1 |  | 7/2004  | Liao et al.                          |
| 2005/0232183 | A1 | * | 10/2005 | Sartori et al. .................. 370/319 |
| 2006/0046643 | A1 | * | 3/2006  | Izumikawa et al. ............... 455/7 |

(Continued)

OTHER PUBLICATIONS

Huang, L. et al., "Resource Allocation for OFDMA Based Relay Enhanced Cellular Networks," Proceedings of the IEEE 65th Vehicular Technology Conference 2007, IEEE, Apr. 2007, pp. 3160-3164, Los Alamitos, United States.

(Continued)

*Primary Examiner* — Christopher M Brandt
(74) *Attorney, Agent, or Firm* — Kenneth L. Sherman, Esq.; Michael Zarrabian, Esq.; Sherman & Zarrabian LLP

(57) ABSTRACT

A method and system for allocating resources for a relay enhanced cellular communication system including a base station, one or more mobile stations and one or more relay stations, is provided. Resource allocation involves allocating subcarriers to one or more access communication links between mobile stations and their serving stations, to meet proportional data rate constraints for the access communication links while improving subcarrier spectrum utilization, and allocating subcarriers to one or more relay communication links between the base station and relay stations to meet proportional data rate constraints for the relay communication links while improving subcarrier spectrum utilization. Further, communication periods are scheduled for access links in access zones and relay links in relay zones. Balancing of communication resources allocated to the access links and relay links may be performed by balancing both subcarrier allocation and scheduling periods.

32 Claims, 5 Drawing Sheets

U.S. PATENT DOCUMENTS

| | | | |
|---|---|---|---|
| 2006/0209671 | A1 | 9/2006 | Khan et al. |
| 2007/0206525 | A1* | 9/2007 | Miller et al. .................. 370/321 |
| 2008/0095037 | A1* | 4/2008 | Chang et al. .................. 370/204 |
| 2008/0107062 | A1* | 5/2008 | Viorel et al. .................. 370/315 |
| 2008/0107063 | A1* | 5/2008 | Oleszczuk ..................... 370/315 |
| 2008/0165719 | A1* | 7/2008 | Visotsky ....................... 370/315 |
| 2008/0171551 | A1 | 7/2008 | Zhu et al. |
| 2008/0175198 | A1 | 7/2008 | Singh et al. |
| 2008/0186900 | A1* | 8/2008 | Chang et al. .................. 370/315 |
| 2008/0188231 | A1* | 8/2008 | Zhu et al. ...................... 455/450 |
| 2008/0219202 | A1* | 9/2008 | Pandey et al. ................. 370/315 |
| 2008/0219365 | A1 | 9/2008 | Viorel et al. |
| 2008/0240054 | A1 | 10/2008 | Sandhu et al. |
| 2009/0003267 | A1* | 1/2009 | Ramachandran et al. .... 370/328 |
| 2009/0161612 | A1 | 6/2009 | Liu et al. |
| 2009/0163218 | A1 | 6/2009 | Liu et al. |
| 2009/0303918 | A1 | 12/2009 | Ma et al. |
| 2009/0312030 | A1 | 12/2009 | Lee et al. |
| 2010/0099352 | A1 | 4/2010 | Lee et al. |
| 2010/0214992 | A1 | 8/2010 | Hart et al. |
| 2010/0260113 | A1 | 10/2010 | Liu et al. |
| 2010/0272009 | A1 | 10/2010 | Cheng et al. |
| 2011/0111693 | A1 | 5/2011 | Nakao et al. |
| 2011/0228700 | A1 | 9/2011 | Mildh et al. |

OTHER PUBLICATIONS

Relay Task Group of IEEE 802.16, "P802.16j Baseline Document for Draft Standard for Local and Metropolitan Area Networks, Part 16: Air Interface for Fixed and Mobile Broadband Wireless Access Systems, Multihop Relay Specification (802.16j-06/026r2)," IEEE 802.16 Working Group, Feb. 9, 2007, pp. 1-58, United States.

Cudak, M. "Draft IEEE 802.16m Requirements (IEEE 802.16m-07/002r3)," IEEE 802.16 Working Group, Aug. 13, 2007, pp. 1-26, United States.

Genc, V. et al., "IEEE 802.16j Relay-Based Wireless Access Networks: An Overview," IEEE Wireless Communications, vol. 15, No. 5, IEEE Communications Society, Oct. 2008, pp. 56-63, United States.

IEEE 802.16 Working Group, "Overview of IEEE P802.16m Technology and Candidate RIT for IMT-Advanced," IEEE 802.16 IMT-Advanced Evaluation Group Coordination Meeting, Jan. 13, 2010, IEEE 802.16 Working Group, 2010, pp. 1-87, La Jolla, United States.

Shen, Z. et al., "Adaptive Resource Allocation in Multiuser OFDM Systems With Proportional Rate Constraints," IEEE Transactions on Wireless Communications, vol. 4, No. 6, IEEE, Nov. 2005, pp. 2726-2737, Los Alamitos, United States.

U.S. Final Office Action for U.S. Appl. No. 12/167,967 mailed on Sep. 1, 2011.

U.S. Non-Final Office Action for U.S. Appl. No. 12/422,107 mailed on Sep. 23, 2011.

Han, Z. et al., "Capacity Optimization Using Subspace Method Over Multicell OFDMA Networks," IEEE Wireless Communications and Networking Conference, Mar. 2004, vol. 4, IEEE Communications Society, pp. 2393-2398, United States.

Li, G. et al., "Downlink Radio Resource Allocation for Multi-Cell OFDMA System," IEEE Transactions on Wireless Communications, vol. 5, No. 12, IEEE Communications Society and the Signal Processing Society, Dec. 2006, pp. 3451-3459, United States.

Cudak, M., "IEEE 802.16m System Requirements (IEEE 802.16m-07/002r4)," IEEE 802.16 Working Group, Oct. 19, 2007, pp. 1-26, United States.

U.S. Non-Final Office Action for U.S. Appl. No. 12/167,967 mailed on Apr. 15, 2011.

U.S. Non-Final Office Action for U.S. Appl. No. 12/167,980 mailed on Jun. 24, 2011.

U.S. Notice of Allowance for U.S. Appl. No. 12/167,967 mailed on May 15, 2012.

U.S. Final Office Action for U.S. Appl. No. 12/422,107 mailed on Mar. 16, 2012.

U.S. Notice of Allowance for U.S. Appl. No. 12/167,980 mailed on Jan. 23, 2012.

* cited by examiner

METHOD AND SYSTEM FOR RESOURCE ALLOCATION IN RELAY ENHANCED CELLULAR SYSTEMS

RELATED APPLICATION

This application claims priority from U.S. Provisional Patent Application Ser. No. 61/016,385, filed on Dec. 21, 2007, incorporated herein by reference.

FIELD OF THE INVENTION

The present invention relates to cellular communication and in particular to relay enhanced cellular communication systems.

BACKGROUND OF THE INVENTION

A typical cellular communication system includes one or more base stations (BS) and multiple mobile stations, as shown in FIG. 1. Each BS defines a cell of coverage, where each mobile station (MS) can communicate with a BS via a BS-MS link while within communication range of the BS cell coverage. In many cellular systems, radio resource management (RRM) for orthogonal frequency division multiple access (OFDMA)-based cellular systems are utilized. Such systems address resource allocations (e.g., frequency, time, power), among BS-MS links (i.e., transmission channels defined by frequency carriers, spreading codes or time slots). There are two types of RRMs: intra-cell RRM and inter-cell RRM. The intra-cell RRM tries to assign resources to MSs or BS-MS links within a cell (and prevent interference among MSs). The inter-cell RRM tries to assign resources to multiple cells (and prevent interference among BSs and MSs in different cells).

Intermediate relay stations (RS) have been used for improving throughput, coverage and spectrum efficiency of cellular systems. FIG. 2 shows an example cellular system including a base station BS and multiple mobile stations (MSs) and relay stations (RS1, . . . , RS6). A two-hop transmission takes place between a BS and MS via a RS, wherein an RS may be an MS itself. The introduction of relay stations brings forth new challenges to RRM for cellular systems. RRM for relay enhanced cellular (REC) systems has to address resource allocations among BS-MS, BS-RS, and RS-MS communication links.

In a REC system, there are two types of cells: BS cells and relay cells. Relay cells that are well separated from each other may reuse subcarriers in their access links.

In order to support relay stations, communication time frames can be divided into access zones and relay zones. Access zones and relay zones are defined in time domain. Relay stations (RSs) communicate with MSs in access zones and communicate with BS in relay zones. Conventional resource management approaches allow a BS to communicate with direct MSs in both access zones and relay zones, however at considerable complexity.

BRIEF SUMMARY OF THE INVENTION

The invention provides a method and system for communication resource allocation in relay enhanced cellular systems with resource reuse. One embodiment involves allocating resources for a relay enhanced cellular communication system including a base station, one or more mobile stations and one or more relay station, and the assigned communication resources including subcarrier frequencies and time periods. Assigning communication resources includes allocating subcarriers to one or more access communication links between mobile stations and their serving stations, to meet proportional data rate constraints of mobile stations, while improving subcarrier spectrum utilization; allocating subcarriers to one or more relay communication links between the base station and relay stations to meet proportional data rate constraints of relay cells, while improving subcarrier spectrum utilization; and scheduling communication periods for access links in access zones and relay links in relay zones. Assigning communication resources may further include balancing communication resources allocated to the access links and relay links by balancing both subcarrier allocation and scheduling periods.

Allocating resources may further include adjusting the scheduling periods of access zones and relay zones to balance the resources allocated to the access links and relay links, and adjusting resource allocations in both the frequency domain and time domain to optimize system throughput, balance multiple-hop links, and meet proportional data rate constraints. Allocating resources may further include applying scheduling period adjustment to access zones and/or relay zones to achieve a coarse balance between access links and relay links, such that if the average resource is assigned to access links is over-balanced, the access zone is shortened and the relay zone period is lengthened accordingly. Allocating resources may further include applying scheduling period adjustment to access zones and/or relay zones to achieve a coarse balance between access links and relay links, such that if the average resource is assigned to relay link is over-balanced, the relay zone is shortened and the access zone period is lengthened accordingly. Further, allocating resources may further include adjusting subcarrier allocations among relay links to refine the balancing between access links and relay links.

These and other features, aspects and advantages of the present invention will become understood with reference to the following description, appended claims and accompanying figures.

DETAILED DESCRIPTION OF THE INVENTION

The invention provides a method and system for communication resource allocation in relay enhanced cellular systems. One embodiment involves allocating resources for a relay enhanced cellular communication system including a base station, one or more mobile stations and one or more relay station, and the assigned communication resources including subcarrier frequencies and time periods. Assigning communication resources includes allocating subcarriers to one or more access communication links between mobile stations and their serving stations, to meet proportional data rate constraints of mobile stations while improving subcarrier spectrum utilization; allocating subcarriers to one or more relay communication links between the base station and relay stations to meet proportional data rate constraints of relay cells, while improving subcarrier spectrum utilization; and scheduling communication periods for access links in access zones and relay links in relay zones. Assigning communication resources may further include balancing communication resources allocated to the access links and relay links by balancing both subcarrier allocation and scheduling periods.

Allocating resources may further include adjusting the scheduling periods of access zones and relay zones to balance the resources allocated to the access links and relay links, and adjusting resource allocations in both the frequency domain and time domain to optimize system throughput, balance multiple-hop links, and meet proportional data rate constraints. Allocating resources may further include applying scheduling period adjustment to access zones and/or relay zones to achieve a coarse balance between access links and relay links, such that if the average resource on access links is over-balanced, the access zone is shortened and the relay zone period is lengthened accordingly. Allocating resources may further include applying scheduling period adjustment to access zones and/or relay zones to achieve a coarse balance between access links and relay links, such that if the average resource on relay link is over-balanced, the relay zone is shortened and the access zone period is lengthened accordingly. Further, allocating resources may further include adjusting subcarrier allocations among relay links to refine the balancing between access links and relay links.

Figure 2:
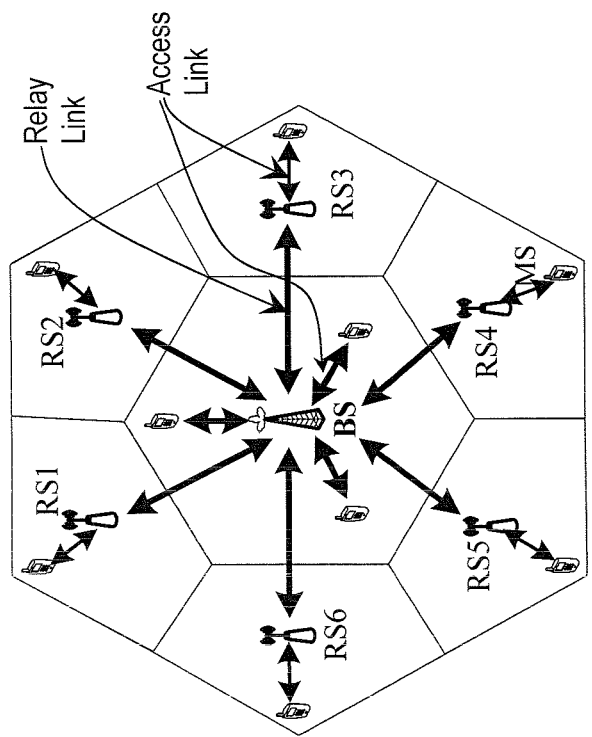
FIG. 2 shows a typical relay enhanced cellular communication system.
Figure 1:
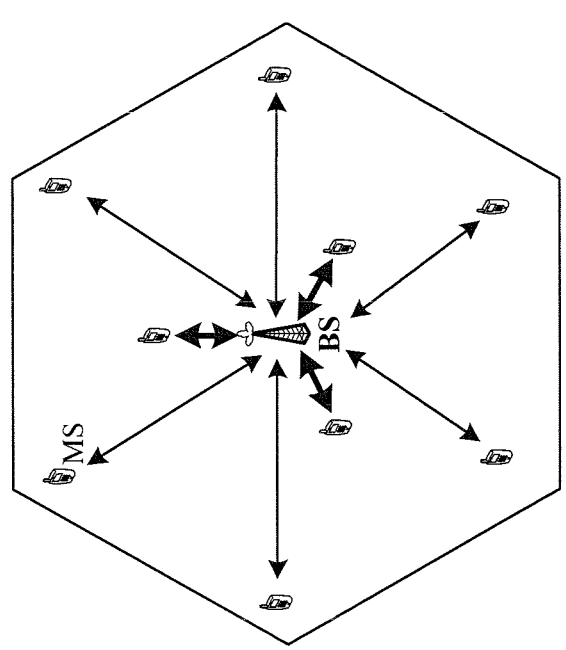
FIG. 1 shows a typical cellular communication system.
Figure 3:
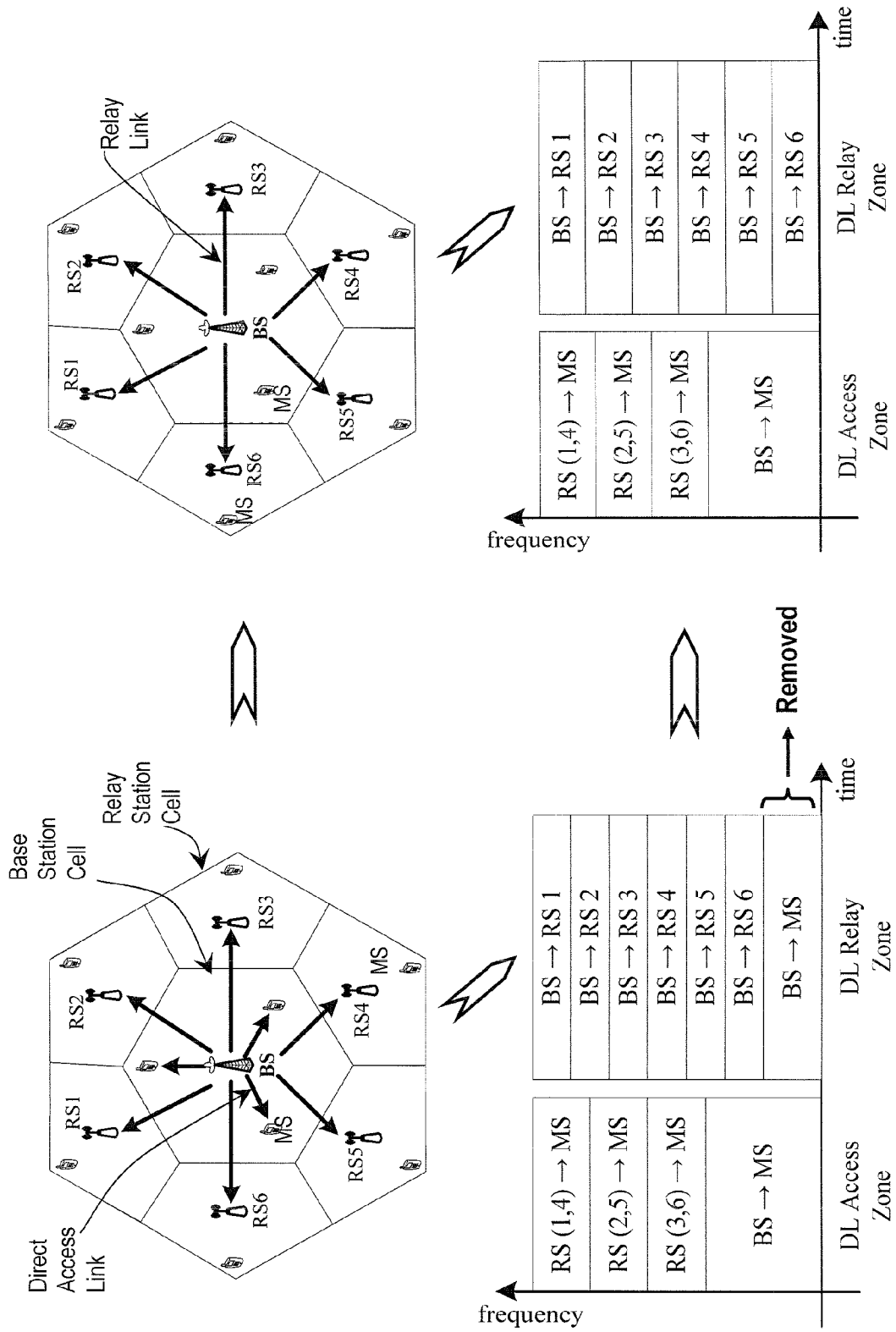
FIG. 3 shows an example where a base station communicates with direct mobile stations only in access zone, instead of both access zone and relay zone (for simplifying design), in a relay enhanced cellular communication system according to the invention.

FIG. 3 illustrates an embodiment of the invention, wherein a BS communicates with direct MSs only in the access zone. While in the relay zone, BS only communicate with RSs. The left part of FIG. 3 shows a scenario, wherein BS is allowed to communicate with direct MSs in both the access zone and relay zone. The right part of FIG. 3 shows an example scenario where BS communicates with direct MSs only in the access zone, and in the relay zone, BS only communicates with RSs, according to the invention.

FIG. 3 also shows resource reuse among relay cells, wherein RS1 and RS4 are assigned the same frequency resource, thus reusing this resource in their access links, RS2 and RS4 are assigned the same frequency resource, thus reusing this resource in their access links, and RS3 and RS6 are assigned the same frequency resource, thus reusing this resource in their access links.

Both subcarrier allocation and time zone adjustment are utilized, subject to proportional data rate constraints. Resource allocation is conducted in both the frequency domain and the time domain, to optimize system throughput, balance multiple-hop links, and meet proportional data rate constraints. Such an allocation process is applicable to many REC systems; including OFDMA based broadband wireless standards, such as IEEE 802.16j and IEEE 802.16m.

In one implementation described below, the allocation process is applicable when the BS communicates directly with mobile stations (direct MSs) only in access zones. In relay zones, the BS only communicates with relay stations. The communication period length of access zones and relay zones can be adjusted to facilitate resource allocations. Further, proportional data rate constraints are considered, instead of minimum data rate constraints. Proportional data rate constraints provide more fairness to MSs and enable very simple designs. Assuming that the data rates of user 1, user 2, . . . , user n, are R1, R2, . . . , Rn, respectively, then the proportional data rate constraint requires that the following formula is always maintained: $R_1 : R_2 : \ldots : R_n = \gamma_1 : \gamma_2 : \ldots : \gamma_n$.

Figure 4:
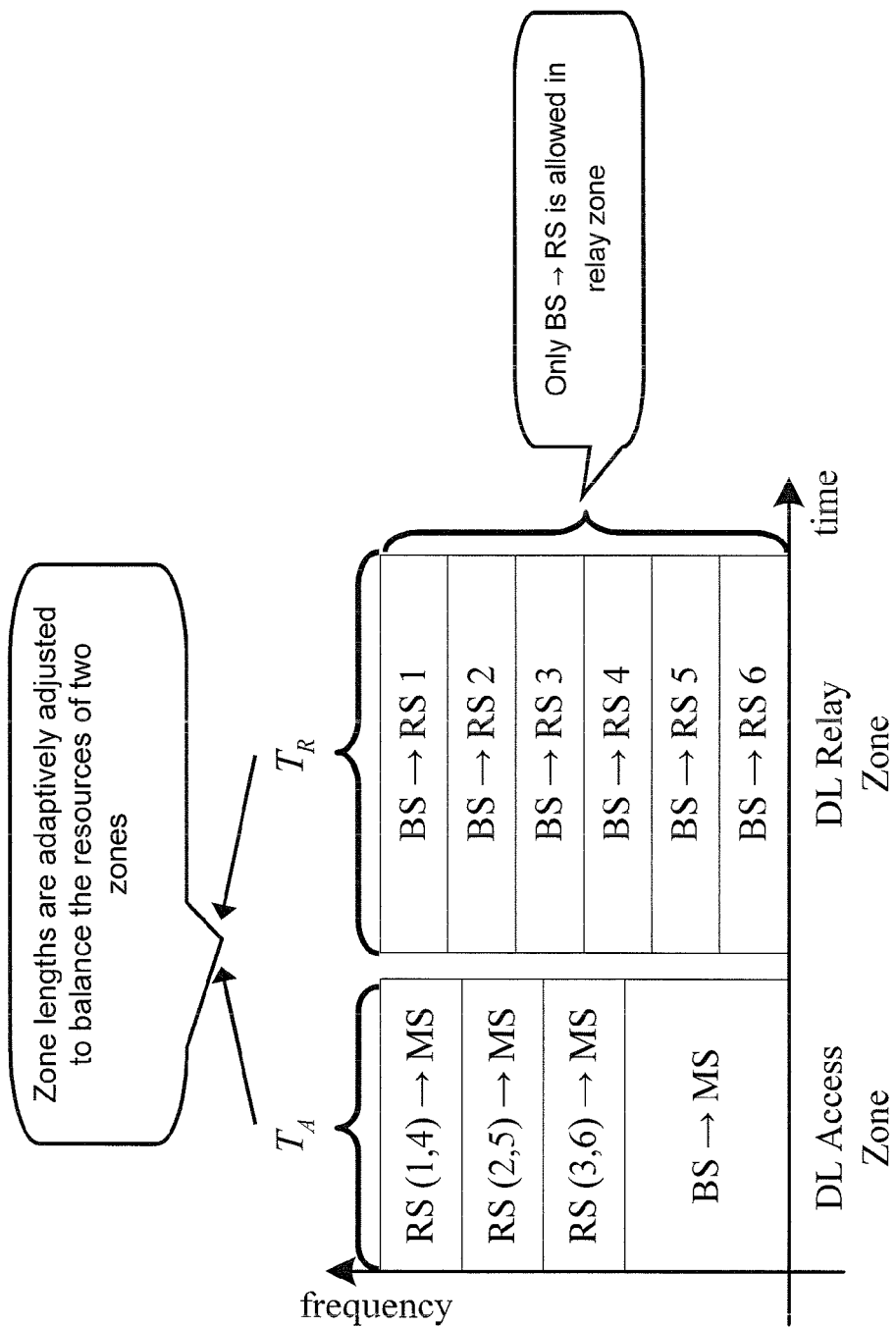
FIG. 4 shows an example of balancing both frequency and time resources allocated to the access and relay zones in a relay enhanced cellular communication system, according to the invention.

As such, the allocation process optimizes throughput of an OFDMA-based REC system, with joint considerations on: subcarrier allocations in both access zones and relay zones; spectral efficiency/multi-user diversity; subcarrier reuse among relay cells; proportional data rate constraints; balancing between access and relay links; adaptive zone length adjustment. An adaptive zone length adjustment scheme is utilized to balance the resources allocated to the access and relay zones, as shown by example in FIG. 4, illustrating that the lengths of the access zone and relay zone can be adaptively ajdusted based on the frequency resource status of these two zones, thus facilitating the resource balancing between access links and relay links.

Initially, the access zone and the relay zone are set to have the same length. Length here means "(time) zone length", i.e. $T_A$ and $T_R$ in FIG. 4. A subcarrier allocation process jointly considering spectrum efficiency and proportional data rate constraint is applied for initial resource assignment. Subcarrier reuse is considered for the resource allocation in the access zone. A zone length adjustment process is then used to achieve a coarse balance between access links and relay links. After that, if access links are over-balanced, the access zone is cut short and the relay zone is lengthened accordingly. If relay links are over-balanced, the relay zone is cut short and the access zone is lengthened accordingly. Finally, subcarriers are adjusted among relay links to achieve a precise balance.

The aforementioned example implementation is described below based on the following assumptions and definitions, without loss of generality.

In a preferred embodiment, the invention focuses on downlink communications from serving stations to relay and mobile stations. Each communication link should be assigned enough resource to meet the proportional data rate constraint. The transmission power from BS and relay stations are fixed. In other words, power control is not considered as a means to optimize/balance resource allocation. Also, a single cell system is considered. As such, inter-cell interferences from other BS cells are not counted. A MS communicates with BS either directly (one-hop), or through one relay station (two-hop). Communication via two or more relay stations (i.e., larger than two-hop) is not considered. BS communicates with one-hop MSs only in the access zone. Relay cells can reuse frequency (subcarrier) resource among their access links, and the resource controller responsible for subcarrier allocation is aware of the achievable data rate of each link on each subcarrier.

Definitions:
  N: The number of subcarriers
  L: The number of RSs
  $M_j$: The number of MSs served by BS/RS j (BS: j=0, RS: j=1, . . . , L)
  $T_F$: The length of the downlink frame
  $T_R$: The length of the relay zone (initially, $T_R = T_F/2$)
  $T_A$: The length of the access zone (initially, $T_A = T_F/2$)
  $r_{XY_j k}^{(n)}$: The achievable data rate of the $XS_j$-$YS_k$ link on subcarrier n Here XS-YS can be BS-MS, BS-RS, or RS-MS $$\alpha_{XY,j_k}^{(n)} = \begin{cases} T_A/T_F: & \text{If subcarrier } n \text{ is assigned to the } XS_j - YS_k \\ & \text{link in the access zone} \\ 0: & \text{If subcarrier } n \text{ is not assigned to} \\ & \text{the } XS_j - YS_k \text{ link in the access zone} \end{cases}$$

$$\beta_{XY,j_k}^{(n)} = \begin{cases} T_R/T_F: & \text{If subcarrier } n \text{ is assigned to the } BS - YS_k \\ & \text{link in the relay zone} \\ 0: & \text{If subcarrier } n \text{ is not assigned to} \\ & \text{the } BS - YS_k \text{ link in the relay zone} \end{cases}$$

End-to-end throughput of all 1-hop MSs:

$$R_{BM} = \sum_{k=1}^{M_0} r_{BM,0_k}$$

where, $$r_{BM,0_k} = \sum_{n=1}^{N} \alpha_{BM,0_k}^{(n)} \cdot r_{BM,0_k}^{(n)}$$

End-to-end throughput of all two-hop MSs $$R_{BRM} = \sum_{j=1}^{L} \min\{R_{RM,j}, R_{BR,j}\}$$

where, $$R_{RM,j} = \sum_{k=1}^{M_j} r_{RM,j_k}$$

$$r_{RM,j_k} = \sum_{n=1}^{N} \alpha_{RM,j_k}^{(n)} \cdot r_{RM,j_k}^{(n)}$$

$$R_{BR,j} = \sum_{n=1}^{N} \beta_{BR,0j}^{(n)} \cdot r_{BR,0j}^{(0)}$$

System overall throughput $$R_{all} = R_{BM} + R_{BRM}$$

Proportion al data rate constraint s:

$$r_{XM,j_k} : r_{XM,j'_{k'}} = r^o_{j_k} : r^o_{j'_{k'}}$$

$$XM = \{BM, RM\}; j, j' = 0,1, \ldots, L; k = 1, \ldots, M_j;$$

$$k' = 1, \ldots, M_{j'}$$

$$R_{BR,j} : R_{BR,j'} = R^o_{BR,j} : R^o_{BR,j'}, j, j' = 1,2, \ldots, L$$

$$R^o_{BY,j} = \sum_{k=1}^{M_j} r^o_{j_k}, BY = \{BM, BR\}; j = 0,1, \ldots, L$$

Proportional Allocation Factor (PAF) of a RS-MS or BS-MS link:

$$PAF_{XM,j_k} = \frac{r_{XM,j_k}}{r^o_{j_k}}, XM = \{BM, RM\};$$

$$j = 0,1, \ldots, L; k = 1, \ldots, M_j$$

The PAF of a BS-RS link:

$$PAF_{BR,j} = \frac{R_{BR,j}}{R^o_{BR,j}}, j = 1, \ldots, L$$

The PAF of the BS cell:

$$PAF_{BM} = \frac{R_{BM}}{R^o_{BM,0}}$$

The PAF of a relay cell:

$$PAF_{RM,j} = \frac{R_{RM,j}}{R^o_{BR,j}}, j = 1, \ldots, L$$

The average PAF of RS-MS links:

$$PAF_{RM} = \frac{\sum_{j=1}^{L} R_{RM,j}}{\sum_{j=1}^{L} R^o_{BR,j}}$$

The average PAF of BS-RS links:

$$PAF_{BR} = \frac{\sum_{j=1}^{L} R_{BR,j}}{\sum_{j=1}^{L} R^o_{BR,j}}$$

A relay cell is under-assigned if
$PAF_{RM,j} < PAF_{RM}$, for any j=1,2, ..., L
A RS-MS link is under-assigned if:
$PAF_{RM,j_k} < PAF_{RM,j}$, for any j=1, ... L; k=1, ..., $M_j$
A BS-MS link is under-assigned if:
$PAF_{BM,0_k} \leq PAF_{BM}$, for any k=1,2, ..., $M_0$
A BS-RS link is under-assigned if
$PAF_{BR,j} < PAF_{BR}$, for any j=1,2, ..., L.
A BS-RS link and its corresponding relay cell is balanced if
$|R_{BR,j} - R_{RM,j}| < \epsilon$, for any j=1, ..., L
A BS-RS link is under-balanced, or a relay cell is over-balanced if
$R_{RM,j} - R_{BR,j} \geq \epsilon$, for any j=1, ..., L
A BS-RS link is over-balanced, or a relay cell is under-balanced if
$RB_{R,j} - R_{RM,j} \geq \epsilon$, for any j=1, ..., L.

Figure 5:
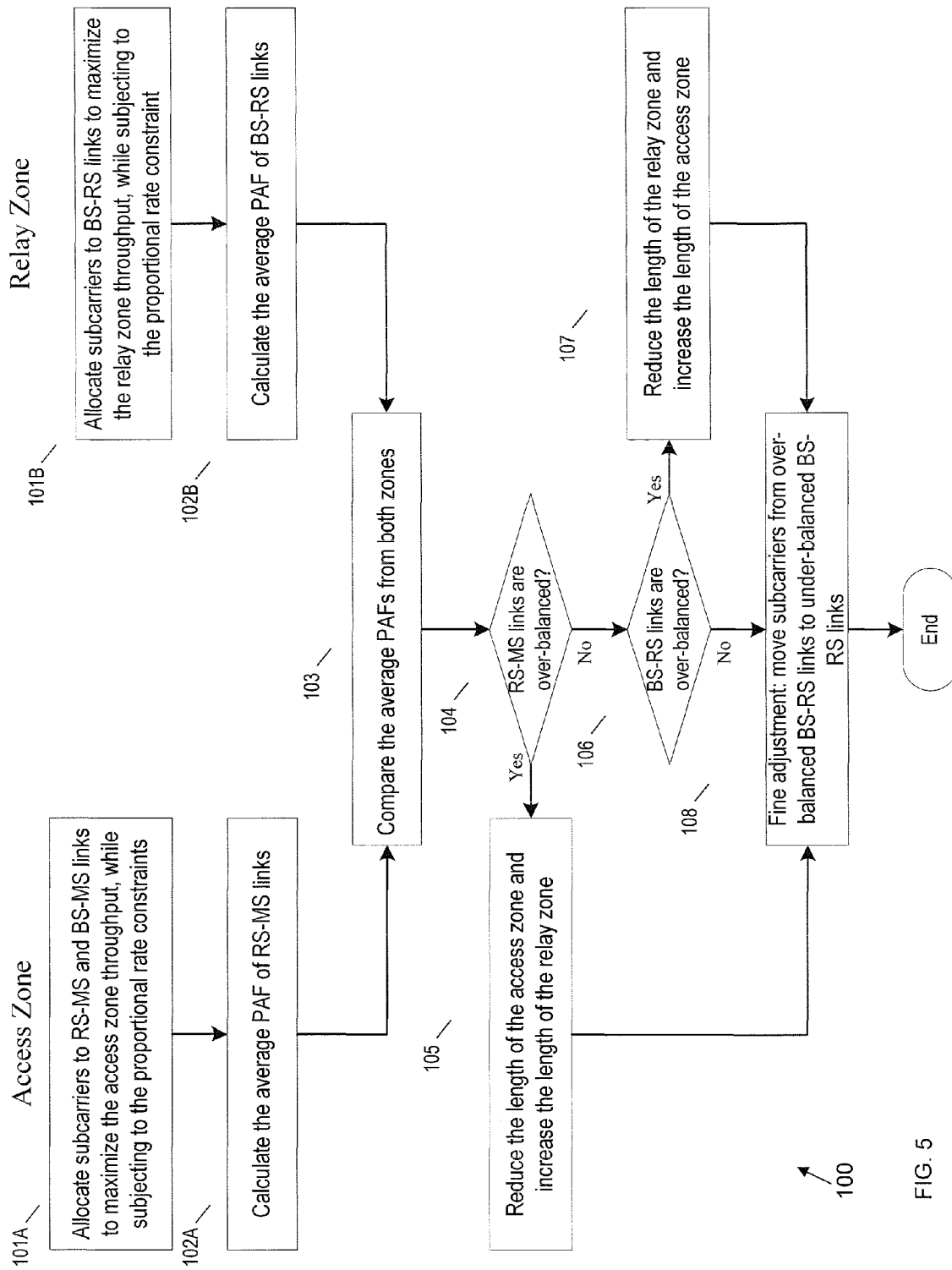
FIG. 5 shows a functional block diagram for allocating both subcarrier frequency and time resources for a relay enhanced cellular communication system, according to an embodiment of the invention.

FIG. 5 shows an example subcarrier allocation process 100 according to the present invention:

Block 101A: In the access zone, allocate subcarriers to RS-MS and BS-MS links to maximize the access zone throughput, while subjecting to the proportional rate constraints.

Block 102A. Calculate the average PAF of RS-MS links. Proceed to block 103.

Block 101B: In the relay zone, allocate subcarriers to BS-RS links to maximize the relay zone throughput, while subjecting to the proportional rate constraint.

Block 102B: Calculate the average PAF of BS-RS links. Proceed to block 103.

Block 103: Compare the average PAFs from the relay and access zones.

Block 104. If RS-MS links are over-balanced, proceed to block 105, otherwise proceed to block 106.

Block 105: Reduce the length of the access zone and increase the length of the relay zone communication period (schedule period). Proceed to block 108.

Block 106: If BS-RS links are over-balanced, proceed to block 107, otherwise proceed to block 108.

Block 107: Reduce the length of the relay zone and increase the length of the access zone communication period. Proceed to block 108.

Block 108: Perform fine adjustment by moving (reallocating) subcarriers from over-balanced BS-RS links to under-balanced BS-RS links. End.

According to blocks 101A-101B, in the access zone, subcarriers are assigned to RS-MS and BS-MS links in the access zone to maximize the access zone throughput, while subjecting to the proportional data rate constraints. Before allocating a subcarrier, the most under-assigned BS/RS cell is first identified based on the following expression:

$$[XM^*,j^*]=(PAF_{BM,j}<\min_{j=1,\ldots,L}(PAF_{RM,j}))?[BM,j=0]:\arg_{[RM,j]}\min_{j=1,\ldots,L}(PAF_{RM,j})).$$

Initially, since all cells have an achieved data rate equal to zero, the most under-assigned cell can be the one with the largest number of MSs, or with he largest value of $R_{BY,j}^{o}=\{BM,BR\};j=0,1,\ldots,L$. Once the most under-assigned cell is identified, the most under-assigned link within the cell is selected based on the following expression:

$$k^*=\arg_k\min_{k=1,\ldots,M_{j^*}}(PAF_{XM^*,j^*}).$$

The selected link is assigned the best unallocated subcarrier, on which it can achieve the highest data rate increase. Again, at the initial stage, since all links have an achieved data rate equal to zero, the most under-assigned link can be the one with the largest value of $r_{j^*_k}^o=1,\ldots,M_{j^*}$. If the most under-assigned cell is the BS cell, the assigned subcarrier should not be considered by RS cells any further.

If the most under-assigned cell is an RS/relay cell, the assigned subcarrier should not be considered by the BS cell any more; however, it may be reused by other relay cells. The remaining relay cells that are under-assigned are examined for this subcarrier based on the ascending sequence of their PAF values. For each considered cell, all under-assigned RS-MS links within the cell are evaluated. The evaluation considers both data rate increase engendered by each link, as well as data rate decreases it causes to the co-channel links. If none of the RS-MS links can benefit the overall access zone throughput, this relay cell is skipped; otherwise, the link that provides most benefit to the throughput is assigned the subcarrier. A subcarrier can be assigned to at most one access link in a cell. The resource allocation continues until all subcarriers in the access zone are exhausted. After that, the average PAF of RS-MS links, i.e., $PAF_{RM}$, are calculated.

According to blocks 101B-102B, in the relay zone, subcarriers are assigned to BS-RS links in the relay zone to maximize the relay zone throughput, while subjected to the proportional data rate constraints. Initially, each link is assigned the best unallocated subcarrier, on which it can achieve the highest data rate increase. The initial link allocation sequence can be random, or based on certain priorities, such as the descending sequence of the maximum achievable rates over all unallocated subcarriers. Iterations are then performed to allocate remaining subcarriers to the under-assigned BS-RS links. In each iteration, the most under-assigned BS-RS link is identified based on the following expression:

$$j^*=\arg_j\min_{j=1,\ldots,L}(PAF_{BR,j}),$$

where j* is index of the BS-RS link selected to be granted the best unallocated subcarrier, assuming the BS-RS links are numbered from 1 to L. The selected link is granted the best unallocated subcarrier, on which it can achieve the highest data rate increase. The resource allocation continues until all subcarriers in the relay zone are exhausted. Thereafter, the average PAF of BS-RS links (i.e., $PAF_{BR}$), are calculated.

In blocks 103-108, $PAF_{BR}$ is compared with $PAF_{RM}$. If $PAF_{RM}$. If $PAF_{RM}$-$PAF_{BR}>\epsilon$ (i.e., the RS-MS links are over-balanced), the access zone communication period is reduced, while the relay zone period is lengthened accordingly. The zone period length change $\Delta T$ can be calculated based on the following expression:

$$\Delta T = \frac{T_F}{2}\cdot\left(\frac{PAF_{RM}-PAF_{BR}}{PAF_{RM}+PAF_{BR}}\right).$$

After the adjustment, the length of the access zone communication period is $T'_A$:

$$T'_A = T_A - \Delta T = \frac{PAF_{BR}}{PAF_{RM}+PAF_{BR}}\cdot T_F.$$

The length of the relay zone period is $T'_R$:

$$T'_R = T_R + \Delta T = \frac{PAF_{RM}}{PAF_{RM}+PAF_{BR}}\cdot T_F.$$

If $PAF_{BR}$-$PAF_{RM}>\epsilon$ (i.e., the BS-RS links are over-balanced), the relay zone period is reduced, while the access zone is lengthened, accordingly. The zone period length change $\Delta T$ can be calculated based on the following expression:

$$\Delta T = \frac{T_F}{2}\cdot\left(\frac{PAF_{BR}-PAF_{RM}}{PAF_{RM}+PAF_{BR}}\right).$$

After the adjustment, the length of the access zone period is:

$$T'_A = T_A + \Delta T = \frac{PAF_{BR}}{PAF_{RM}+PAF_{BR}}\cdot T_F$$

The length of the relay zone period is:

$$T'_R = T_R - \Delta T = \frac{PAF_{RM}}{PAF_{RM}+PAF_{BR}}\cdot T_F$$

Once $|PAF_{BR}$-$PAF_{RM}|<\epsilon$, i.e., BS-RS links and RS-MS links are roughly balanced, each individual BS-RS link is checked against its corresponding relay cell. If some of the BS-RS links are over-balanced, while some other links are under-balanced, subcarriers are moved from the overbalanced BS-RS links to the under-balanced BS-RS links. In each adjustment, the most over-balanced BS-RS link is identified by:

$$j^* = \arg_j \max\left(\frac{R_{BR,j}}{R_{RM,j}} \mid R_{BR,j} > R_{RM,j}\right).$$

The subcarrier that benefits the least to this link is picked out, and reallocated to one of the under-balanced BS-RS links. The BS-RS link selected to accept the subcarrier should achieve the highest data rate increase with this subcarrier among all under-balanced BS-RS links.

Figure 6:
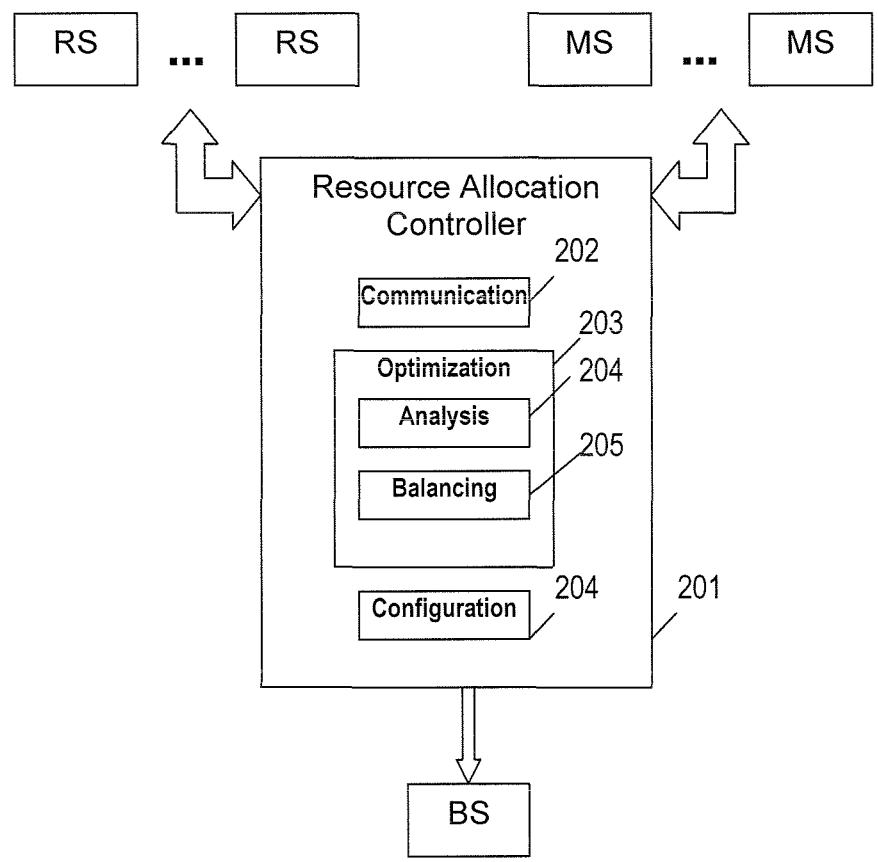
FIG. 6 shows a functional block diagram of a resource allocation controller configured for allocating both subcarrier frequency and time resources for a relay enhanced cellular communication system, according to an embodiment of the invention.

FIG. 6 shows a functional block diagram of a relay enhanced cellular system 200 including a resource allocation controller 201 configured for allocating communication resources, according to an embodiment of the invention. The controller implements the blocks in FIG. 5, described above. The controller 201 includes a communication module 202, an optimization module 203 and a configuration module 204. The communication module exchanges information with the RS and MS stations. The optimization module includes an analysis module 204 and a balancing module 205. The analysis module determines link throughput and assigned/under-assigned/balanced/over-balanced status of the RS-MS and BS-RS links as described above. The balancing module determines a balancing plan for allocation/reallocation/assignment of subcarrier resources to the links based on the analysis results. The configuration module communicates with the BS, RS and MS stations to configure them according to the balancing plan.

The controller 201 allocates frequency and time resources for a relay enhanced cellular communication system including a base station, one or more mobile stations and one or more relay stations. The controller 201 assigns communication resources by allocating subcarriers to one or more access communication links between mobile stations and their serving stations (i.e., between relay stations and mobile stations; as well as between the base station and its direct mobile stations) to meet proportional data rate constraints and also maximize spectrum utilization. The controller further allocates subcarriers to one or more relay communication links between the base station and relay stations to meet proportional data rate constraints and also maximize spectrum utilization. Allocating communication resources further includes considering both subcarrier allocation and scheduling periods to balance the resources allocated to the access links and relay links.

The controller adjusts the scheduling periods of access zones and relay zones to balance the resources allocated to the access links and relay links. The scheduling periods comprise the lengths of access (time) zone and relay (time) zone. Both frequency and time are considered as communication resources. A link assigned more frequency subcarriers and more communication time can transmit more data. At the beginning of resource allocation, the resource controller does not know the frequency resource of the access zone and relay zone. As such, initially the time resource is halved between these two zones, i.e., the lengths of these two zones are set as equal.

Once the controller allocates the frequency resource, and finds out the resource status of the access zone and relay zone, it can adjust the time resource, i.e., the lengths of the access zone and relay zone, to make the access links and relay links achieve coarse resource balancing.

In other words, the frequency resource and time resource can complement each other and make the resource allocation more flexible.

Allocating resources may farther include adjusting resource allocations in both the frequency domain and time domain to optimize system throughput, balance multiple-hop links, and meet proportional data rate constraints.

Zone period adjustment is performed by the controller to achieve a coarse balance between access links and relay links, such that if the average resource on access links is over-balanced, the access zone period is shortened and the relay zone period is lengthened accordingly. Zone period, zone length, and scheduling period designate the same parameter, for determining the time resource assigned to communication links.

Zone period adjustment is also applied by the controller to achieve a coarse balance between access links and relay links, such that if the average resource on the relay link is over-balanced, the relay zone period is shortened and the access zone period is lengthened accordingly. The average resource is essentially the average of the frequency resources allocated to relay cells/relay links in access zone/relay zone, respectively. It is a parameter to roughly measure the frequency resource status in access zone and relay zone in order to decide how to conduct adaptive zone length adjustment.

Further, subcarriers are adjusted by the controller among relay links to refine the balancing of resource allocation between access links and relay links. Specifically, the zone length adjustment is conducted based on the average frequency resource status of access zone and relay zone. A coarse balancing between access zone and relay zone is achieved. The subcarrier adjustment follows the zone length adjustment to refine the balancing between access links and relay links, providing individual balancing between access links and relay links.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of allocating resources for a relay enhanced cellular communication system including a base station, one or more mobile stations and one or more relay stations, comprising:
   assigning communication resources including subcarrier frequencies and time periods by:
   allocating subcarriers to one or more access communication links between mobile stations and their serving stations and between base stations and their direct mobile stations, to meet proportional data rate constraints of mobile stations while improving subcarrier spectrum utilization;
   allocating subcarriers to one or more relay communication links between the base station and relay stations to meet proportional data rate constraints of relay cells while improving subcarrier spectrum utilization;
   scheduling communication periods for access links in access zones and relay links in relay zones;

selectively adjusting the scheduled communication periods for access zones and relay zones for providing coarse balancing of the resources allocated to the access links and the resources allocated to the relay links; and adjusting subcarriers among relay links for refining balancing of resource allocation between access links and relay links.

2. The method of claim 1, wherein assigning communication resources further includes balancing communication resources allocated to the access links and relay links by balancing both subcarrier allocation and scheduling periods.

3. The method of claim 2, wherein the serving stations include base stations and relay stations, such that some "indirect" mobile stations communicate with the base station via relay stations; while the direct mobile stations communicate directly with the base station without relying on relay stations.

4. The method of claim 3, wherein allocating resources further includes adjusting the scheduling periods of access zones and relay zones to balance the resources allocated to the access links and relay links, wherein scheduling periods comprise communication periods.

5. The method of claim 2, wherein allocating resources further includes adjusting resource allocations in both the frequency domain and time domain to optimize system throughput, balance multiple-hop links, and meet proportional data rate constraints.

6. The method of claim 2, wherein allocating resources further includes applying scheduling period adjustment to access zones and/or relay zones to achieve a coarse balance between access links and relay links, wherein if the average resource on access links is over-balanced, the access zone is shortened and the relay zone period is lengthened accordingly.

7. The method of claim 2, wherein allocating resources further includes applying scheduling period adjustment to access zones and/or relay zones to achieve a coarse balance between access links and relay links, wherein if the average resource on relay links is over-balanced, the relay zone is shortened and the access zone period is lengthened accordingly.

8. The method of claim 2, wherein allocating resources further includes adjusting subcarrier allocations among relay links to refine the balancing between access links and relay links.

9. The method of claim 1, wherein adjusting the access zone length and relay zone length is based on average frequency resource status of access zones and relay zones.

10. The method of claim 9, wherein refined balancing between access links and relay links is achieved based on individual balancing between access links and relay links.

11. The method of claim 1, further comprising:
applying scheduling period adjustment to access zones and/or relay zones for achieving a coarse balance between access links and relay links based on adjusting access zone period length and relay zone period length.

12. The method of claim 1, further comprising upon coarsely balancing communication links between base stations and relay stations and communication links between relay stations and mobile stations, performing balance checking for each individual communication link between base stations and relay stations against its corresponding relay station.

13. The method of claim 12, wherein if one or more communication links between the base stations and relay stations are over-balanced, while one or more other communication links between the base stations and relay stations are under-balanced, moving subcarriers from the overbalanced communication links between the base stations and relay stations to the under-balanced communication links between the base stations and relay stations.

14. An apparatus for allocating resources for a relay enhanced cellular communication system including a base station, one or more mobile stations and one or more relay stations, comprising:
an optimization module configured for assigning communication resources including subcarrier frequencies and time periods by:
allocating subcarriers to one or more access communication links between mobile stations and their serving stations and between base stations and their direct mobile stations, to meet proportional data rate constraints of mobile stations while improving subcarrier spectrum utilization;
allocating subcarriers to one or more relay communication links between the base station and relay stations to meet proportional data rate constraints of relay cells while improving subcarrier spectrum utilization; and
scheduling communication periods for access links in access zones and relay links in relay zones;
wherein the optimization module includes a balancing module configured for:
selectively adjusting the scheduled communication periods for access zones and relay zones for providing coarse balancing of the resources allocated to the access links and the resources allocated to the relay links; and
adjusting subcarriers among relay links for refining balancing of resource allocation between access links and relay links.

15. The apparatus of claim 14, wherein the balancing module is further configured for balancing communication resources allocated to the access links and relay links by balancing both subcarrier allocation and scheduling periods.

16. The apparatus of claim 15, wherein the serving stations include base stations and relay stations, such that some "indirect" mobile stations communicate with the base station via relay stations; while the direct mobile stations communicate directly with the base station without relying on relay stations.

17. The apparatus of claim 16, wherein the balancing module is further configured for adjusting the scheduling periods of access zones and relay zones to balance the resources allocated to the access links and relay links.

18. The apparatus of claim 15, wherein the balancing module is further configured for adjusting resource allocations in both the frequency domain and time domain to optimize system throughput, balance multiple-hop links, and meet proportional data rate constraints.

19. The apparatus of claim 16, wherein the balancing module is further configured for applying scheduling period adjustment to access zones and/or relay zones for achieving a coarse balance between access links and relay links, wherein if the average resource on access links is over-balanced, the access zone is shortened and the relay zone period is lengthened accordingly.

20. The apparatus of claim 16, wherein the balancing module is further configured for applying scheduling period adjustment to access zones and/or relay zones for achieving a coarse balance between access links and relay links, wherein if the average resource on relay links is over-balanced, the relay zone is shortened and the access zone period is lengthened accordingly.

21. The apparatus of claim 16, wherein the balancing module is further configured for adjusting subcarrier allocations among relay links to refine the balancing between access links and relay links.

22. The apparatus of claim 16, wherein the optimization module further includes an analyzing module configured for determining link throughput and resource balance status of the relay links and access links.

23. The apparatus of claim 14, wherein the optimization module includes a balancing module configured for applying scheduling period adjustment to access zones and/or relay zones for achieving a coarse balance between access links and relay links based on adjusting access zone period length and relay zone period length.

24. A relay enhanced cellular communication system, comprising:
   a base station, one or more mobile stations and one or more relay stations;
   a controller configured for allocating resources, the controller comprising an optimization module and a balancing module,
      wherein the optimization module is configured for assigning communication resources including subcarrier frequencies and time periods by:
      allocating subcarriers to one or more access communication links between mobile stations and their serving stations and between base stations and their direct mobile stations, to meet proportional data rate constraints for the access communication links while improving subcarrier spectrum utilization;
      allocating subcarriers to one or more relay communication links between the base station and relay stations to meet proportional data rate constraints for the relay communication links while improving subcarrier spectrum utilization; and
      scheduling communication periods for access links in access zones and relay links in relay zones,
   wherein the balancing module is configured for applying scheduling period adjustment to access zones and/or relay zones for achieving a coarse balance between access links and relay links based on adjusting access zone length and relay zone length, and adjusting subcarriers among relay links for refining balancing of resource allocation between access links and relay links.

25. The system of claim 24, wherein the balancing module is further configured for balancing communication resources allocated to the access links and relay links by balancing both subcarrier allocation and scheduling periods.

26. The system of claim 25, wherein the serving stations include base stations and relay stations, such that some "indirect" mobile stations communicate with the base station via relay stations; while the direct mobile stations communicate directly with the base station without relying on relay stations.

27. The system of claim 26, wherein the balancing module is further configured for adjusting the scheduling periods of access zones and relay zones to balance the resources allocated to the access links and relay links.

28. The system of claim 25, wherein the balancing module is further configured for adjusting resource allocations in both the frequency domain and time domain to optimize system throughput, balance multiple-hop links, and meet proportional data rate constraints.

29. The system of claim 25, wherein the balancing module is further configured for applying scheduling period adjustment to access zones and/or relay zones for achieving a coarse balance between access links and relay links, wherein if the average resource on access links is over-balanced, the access zone is shortened and the relay zone period is lengthened accordingly.

30. The system of claim 25, wherein the balancing module is further configured for applying scheduling period adjustment to access zones and/or relay zones for achieving a coarse balance between access links and relay links, wherein if the average resource on the relay link is over-balanced, the relay zone is shortened and the access zone period is lengthened accordingly.

31. The system of claim 25, wherein the balancing module is further configured for adjusting subcarrier allocations among relay links to refine the balancing between access links and relay links.

32. The system of claim 25, wherein the optimization module further includes an analyzing module configured for determining link throughput and resource balance status of the relay links and access links.

* * * * *